(12) United States Patent
Burdock

(10) Patent No.: US 6,550,804 B2
(45) Date of Patent: Apr. 22, 2003

(54) DRIVER SIDE AIR BAG MODULE WITH ANNULAR AIR BAG

(75) Inventor: John M. Burdock, St. Clair Shores, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/870,906

(22) Filed: May 31, 2001

(65) Prior Publication Data

US 2002/0117838 A1 Aug. 29, 2002

Related U.S. Application Data

(60) Provisional application No. 60/271,133, filed on Feb. 23, 2001.

(51) Int. Cl.$^7$ .......................... B60R 21/16; B60R 21/22
(52) U.S. Cl. ................. 280/731; 280/743.1; 280/728.3; 280/743.2; 280/729
(58) Field of Search .......................... 280/743.1, 728.3, 280/743.2, 729, 731

(56) References Cited

U.S. PATENT DOCUMENTS

| | | | |
|---|---|---|---|
| 3,618,979 A | 11/1971 | Gulette | |
| 3,819,203 A | 6/1974 | Radke et al. | |
| 3,831,973 A | 8/1974 | Meacham | |
| 4,828,286 A | 5/1989 | Föhl | |
| 5,125,682 A | 6/1992 | Hensler et al. | |
| 5,190,313 A | * 3/1993 | Hickling | 280/731 |
| 5,253,892 A | 10/1993 | Satoh | |
| 5,439,247 A | 8/1995 | Kolb | |
| 5,927,754 A | 7/1999 | Patzelt et al. | |
| 6,042,147 A | 3/2000 | Nishijima et al. | |

FOREIGN PATENT DOCUMENTS

| | | | |
|---|---|---|---|
| DE | 197 42 506 A1 | * | 4/1999 |
| DE | 197 49 914 A1 | * | 5/1999 |
| DE | 199 04 072 A1 | * | 8/2000 |
| DE | 199 32 696 C1 | * | 9/2000 |
| DE | 200 10 726 U1 | * | 10/2000 |
| DE | 20105002 U1 | * | 7/2001 |
| GB | 1 362 672 | | 7/1971 |
| GB | 2 268 128 | | 1/1994 |
| JP | 63301144 | | 12/1988 |
| JP | 9-86338 A | * | 3/1997 |
| WO | WO 97/34783 | | 9/1997 |

* cited by examiner

Primary Examiner—Paul N. Dickson
Assistant Examiner—Ruth Ilan
(74) Attorney, Agent, or Firm—Markell Seitzman

(57) ABSTRACT

An air bag module including an air bag, the air bag including: a face panel having a first central opening therein; a rear panel having a second central opening therein, that portion of the rear panel about the second central opening forming a neck portion; a tubular insert having an open end secured to the face panel about the first central opening, the tubular insert including a closed end opposite the open end, the tubular insert extending into the air bag, sides of the tubular insert including at least one opening; the tubular insert including an inflatable portion having an open end secured about the at least one opening and upon inflation the inflatable portion is moved into the center of the tubular insert.

15 Claims, 8 Drawing Sheets

DRIVER SIDE AIR BAG MODULE WITH ANNULAR AIR BAG

This is a regularly filed utility patent application claiming priority of provisional patent application No. 60/271,133, filed Feb. 23, 2001.

BACKGROUND AND SUMMARY OF THE INVENTION

The invention generally relates to driver side air bags, modules and methods of folding an air bag.

The typical driver side air bag module comprises a housing, an inflator, an air bag and a cover. The housing is mounted at or near the hub of the steering wheel; the inflator and air bag are located within the housing and the cover protects the air bag. As the air bag inflates, the cover is broken apart thereby permitting the inflating air bag to expand. As can be appreciated, because the cover is a sacrificial part of the module it cannot be used to support permanent buttons, displays, switches and the like.

Another characteristic of the prior art construction is that on deployment, the expanding air bag is initially thrust directly toward the occupant, which may increase the level of forceful interference between the occupant and the expanding air bag. To restrict this forward motion, many prior art systems have resorted to the use of tethers, which attempt to control the trajectory of the expanding air bag.

It is an object of the present invention to provide an air bag module with a center control module that is fixed in relationship to the steering wheel and one in which the air bag and cover deploy about this fixed center control module. Consequently, an advantage of this construction is the fixed center module can now support control or communication mechanisms and devices such as a horn switch, radio dials, cruise control buttons and even more complicated and expensive visual displays for a navigation system, including GPS satellite receiver display. These additional mechanisms and devices will be unaffected by the deployment of the air bag and need not be repaired when a new air bag module is installed or can be reused in replacement air bag modules.

Another object of the invention is to provide a module in which the air bag is encouraged to initially fill radially due in part to the fixed center control module.

Accordingly the invention comprises: an air bag module, comprising an air bag, the air bag including: a circular face panel having a central, circular first opening; a circular rear panel of substantially the same diameter as that of the first panel and having a central, circular second opening, the diameter of the second opening being smaller than the diameter of the first opening. An inflatable, cylindrical tube member is secured to the face panel, about the first opening, the cylindrical member including a rectangular panel formed into a cylinder, closed at one end; the cylindrical member at an opposite second end is secured to the face panel about the first opening; at least one inflatable lobe secured about an opening in the cylindrical wall, the lobe on inflation of the air bag inflates inwardly toward the center of the face panel.

Many other objects and purposes of the invention will be clear from the following detailed description of the drawings.

DETAILED DESCRIPTION OF THE DRAWINGS

Figure 1:
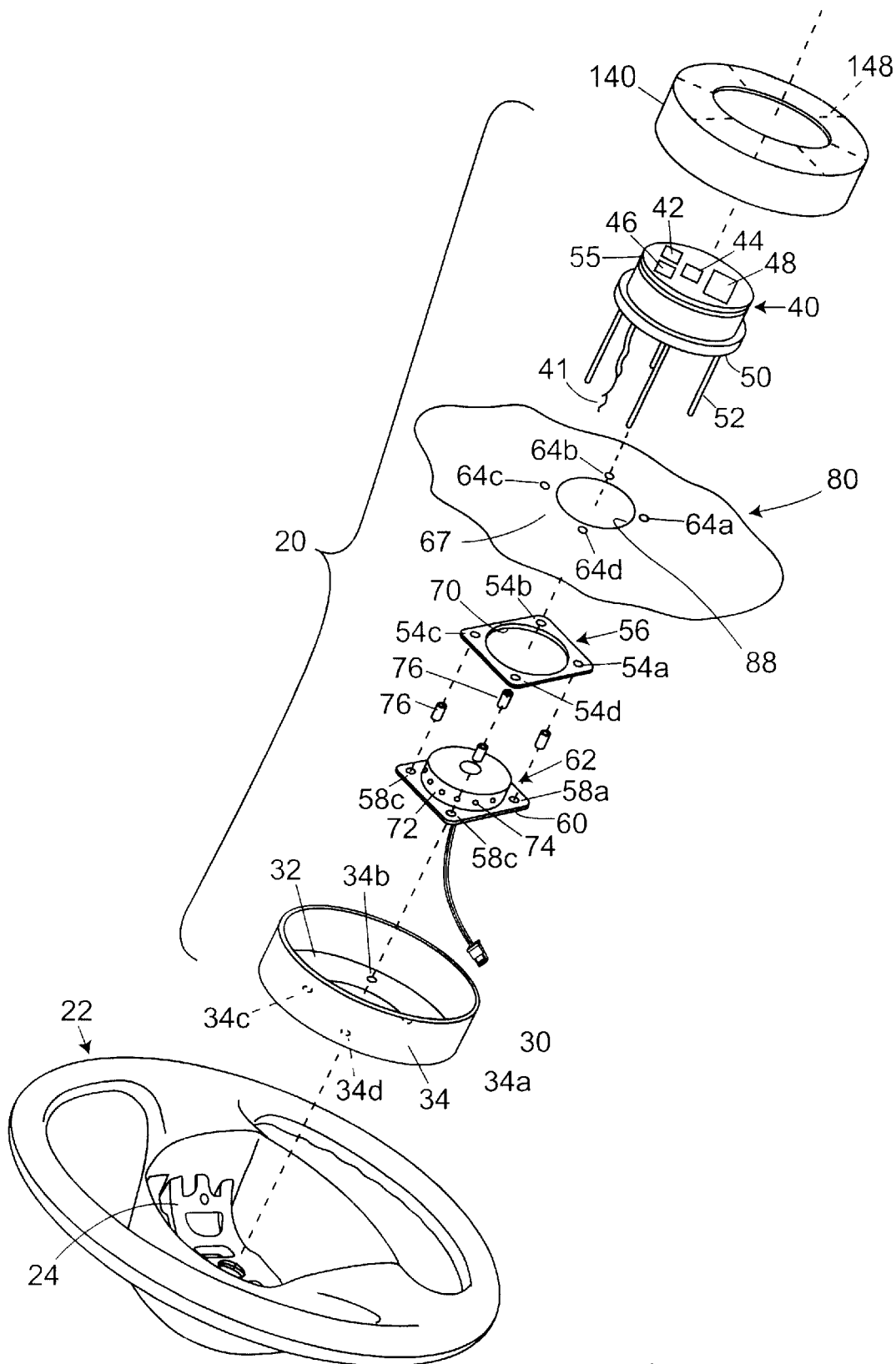
FIG. 1 is an assembly view showing a steering wheel and an air bag module incorporating the present invention.
Figure 2:
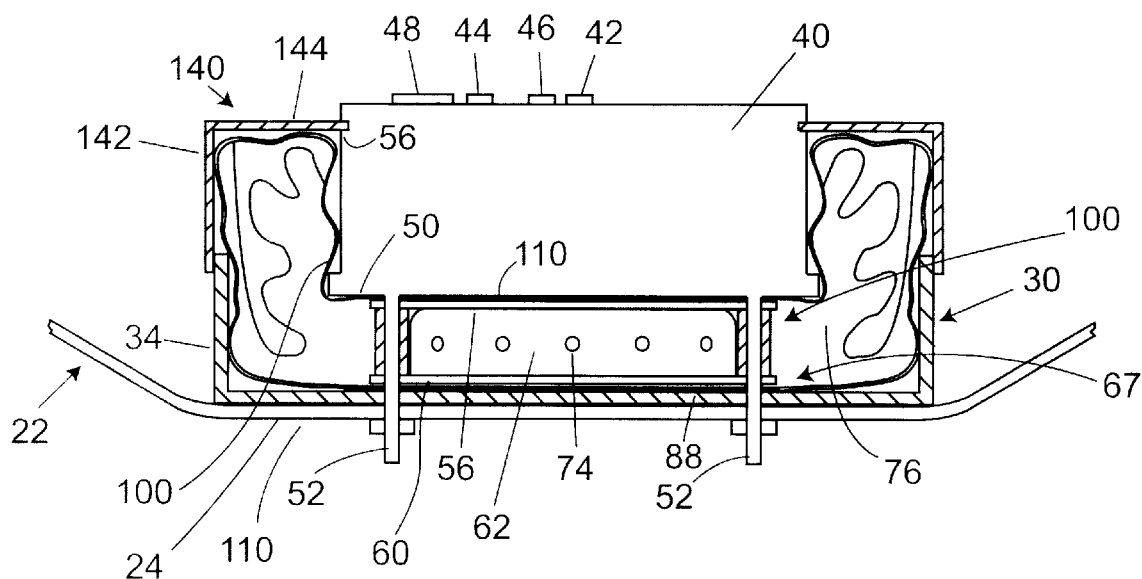
FIG. 2 is a cross-sectional view of an assembled module fastened to the steering wheel.
Figure 9:
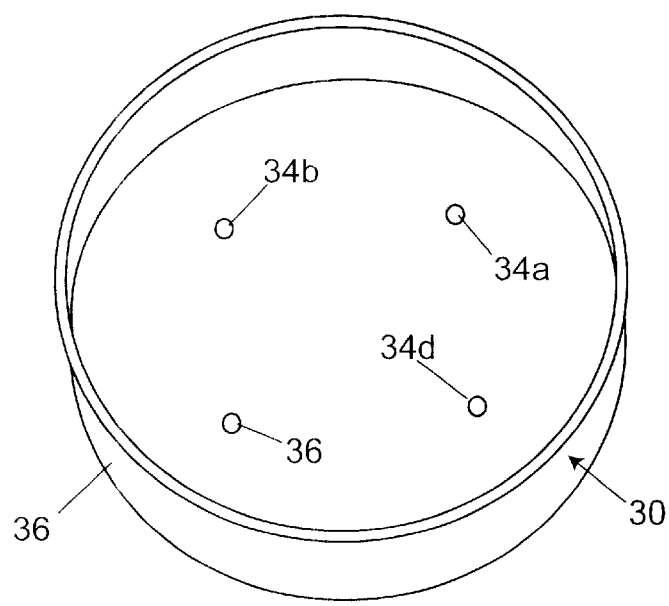
FIG. 9 is an isolated, isometric view of an exemplary housing 30.
Figure 11:
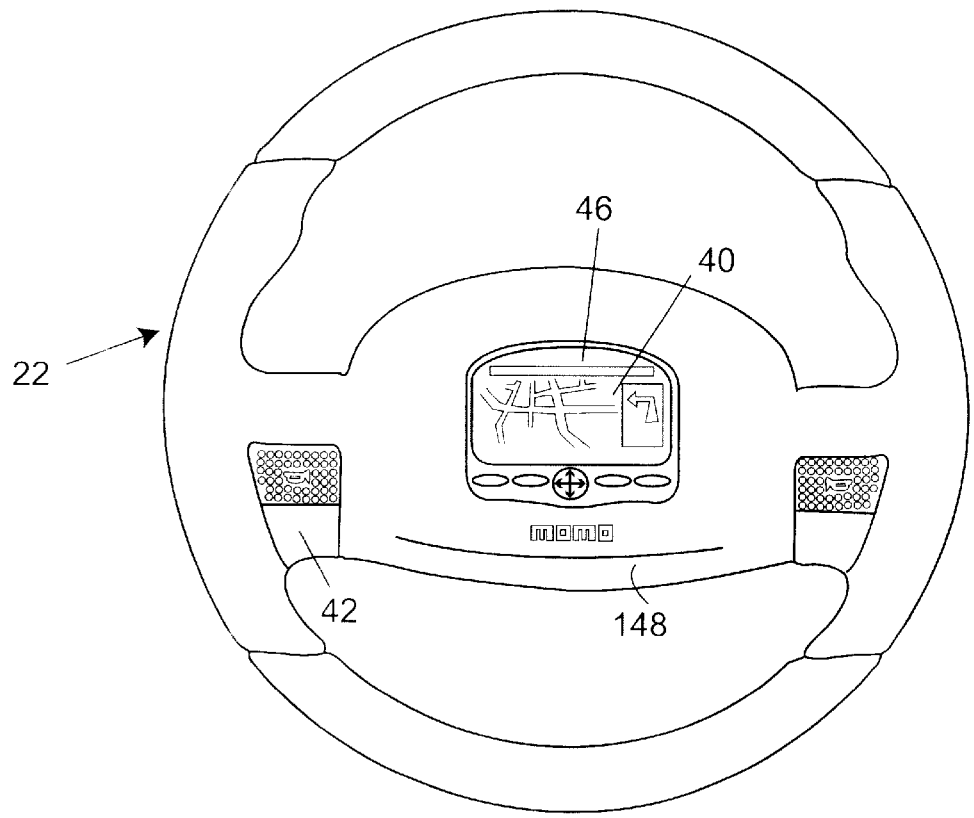
FIG. 11 is a plan view of a module in a steering wheel.

Reference is made to FIGS. 1, 2 and 9, which illustrate a driver side air bag module 20 and its various components. The module is adapted to be secured to a steering wheel 22 and more particularly to the hub 24 of the steering wheel. The module can be secured or attached to the steering wheel in any of many acceptable ways. The module 20 comprises a housing 30 having a bottom 32. The housing can be flat or, for example, pie-shape in which case the housing will also include an upraised side wall or walls following the contour of the plate. As shown, the housing also includes an optional cylindrical, circular side wall 34. The bottom 32 includes a plurality of stud-receiving openings 34a–34d (also shown in FIG. 9). The housing 30 is received upon the center of the hub. The module additionally includes a center (control) module 40. As shown, the center module is circular but can be varied shapes. The module 40 may house signal conditioning electronics and also support one or more displays or mechanisms such as a horn switch 42, radio buttons 44, a navigation system 46 and its associated display 48, cruise control buttons (not shown), etc. Electric wires 41 carry signals to and from the control module. FIG. 11 shows a top view of an assembled steering wheel and air bag module with a representative informational device. The specific shape of the housing, center module and cover will vary with each application. Generally, the sides of the housing and cover will cooperate with the center module 40 to create a covered trough, which extends about the center module to receive the folded or compressed air bag. This trough may be circular, triangular, oval, etc. as dictated by performance and styling considerations and, of course, by the shape of the housing, cover and control module.

A plurality of threaded mounting studs 52 extend from the bottom 50 of the center module. These studs extend through openings 54a–54d of a retaining ring 56, through openings 58a–58d in the flange 60 of an inflator 62, as well as through various openings 64a–64d in the neck portion 67 of an air bag 80 (only a portion of the air bag is shown in FIG. 1). The studs can also extend through the hub of the steering wheel as one means of fastening the module to the steering wheel. As can be seen in FIG. 2 the neck portion 67 of the bag is clamped between the housing and an inflator flange 60. As will be seen later, these studs also extend through other openings in a top 110 portion of a fabric tube 100, which is part of the air bag and is not shown in FIG. 1. This top portion is clamped between the ring 56 and the bottom of the control module 40.

Figure 3:
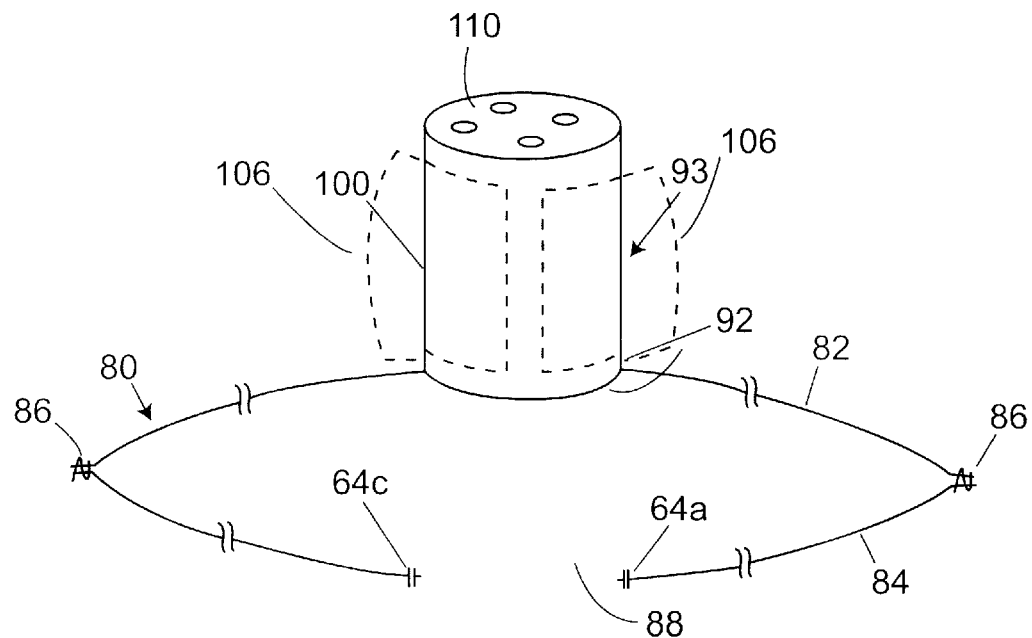
FIG. 3 is a cross-sectional view of a partially constructed air bag with an extending tubular segment.

The ring 56 is generally flat having an opening 70 of sufficient size to receive the typically cylindrical body 72 of the inflator. If preferred, the sides of the ring can be bent to increase its strength. The inflator includes a plurality of exit ports 74 through which inflator gas is communicated to the air bag. The module 20 also includes a plurality of hollow, cylindrical tube sections or spools 76, which function as stand-offs to properly space the center module relative to the housing 30. As can be seen in FIG. 3, the spools 76 are positioned between the inflator flange and the retainer.

Figure 4:
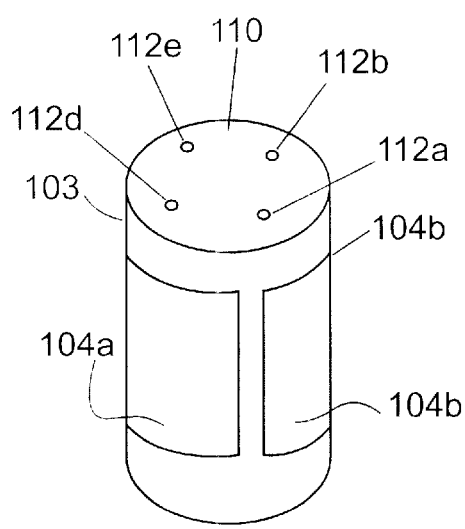
FIG. 4 is another view of the tubular segment without the inflatable lobes.
Figure 5:
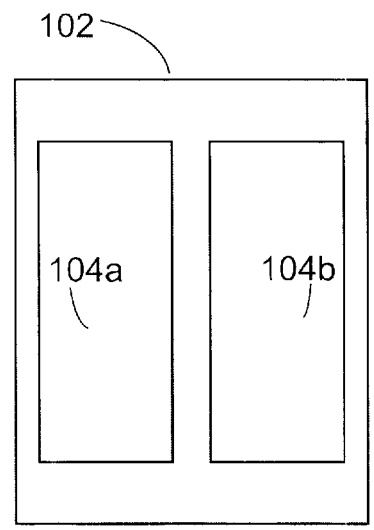
FIG. 5 is a plan view of an additional panel of the air bag used to form the walls of the tubular segment.
Figure 6:
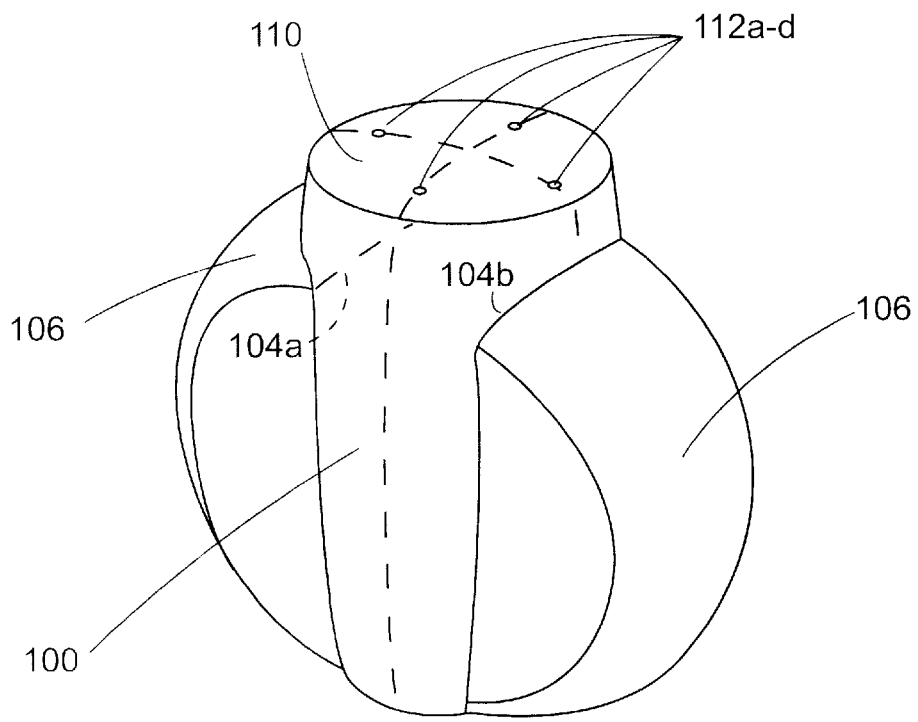
FIG. 6 is a partial view of the air bag showing the extending tubular segment (of FIGS. 3 and 4) with inflatable lobes extending therefrom.

Reference is made to FIG. 3, which illustrates many components of the air bag 80. The air bag comprises a circular face panel 82 and a circular rear panel 84 that are sewn together along a peripheral seam generally shown as 86. The rear panel, at its neck 67, includes a center opening 88, which is located interior to the mounting openings 64a–64d (also in the neck 67). The inflator 62 is received within this opening 88. The face panel also includes a center opening 92. The diameter of opening 92 is sufficient to receive the center control module 40 and can be larger than opening 64. As shown in FIG. 3, this opening 92 is secured to and closed by a center assembly 93. The center assembly 93 includes a cylindrical extension or tube 100, made of air bag material, having a closed end or top formed by a panel 110. The lower open end 95 (see FIG. 4) of the tube is sewn to the face panel about opening 92. The cylindrical extension or tube 100 is fabricated using a first rectangular panel of air bag material 102 (shown in FIG. 5), which is formed into a cylinder or tube 100. This panel 102 includes a plurality of openings 104a and 104b. In the preferred embodiment two such openings are employed. Panel 110 can be made of air bag material (or other non-porous material for example) and is sewn to an end of the tube closing as shown in FIGS. 3, 4 and 6. Each opening 104a and 104b is enclosed by a respective lobe, sock or bag 106. As can be seen in FIGS. 4 and 6, each lobe 106 is secured to the panel 102 about the edges of a respective one of the openings 104a and 104b. These lobes 106 are shown in phantom line in FIG. 3. The purpose of the lobes 106 will be apparent from the description below. The panel 110 in the illustrated embodiment is circular in shape as it is contemplated that the bottom of the central module is circular. In general, however, the panel 110 would follow the approximate contour of the module. As can be appreciated, the tube could be sewn closed along its top, eliminating the need for a panel 110. The top or panel 110 includes a plurality of mounting openings 112a–112d to receive a corresponding stud 52.

Figure 7:
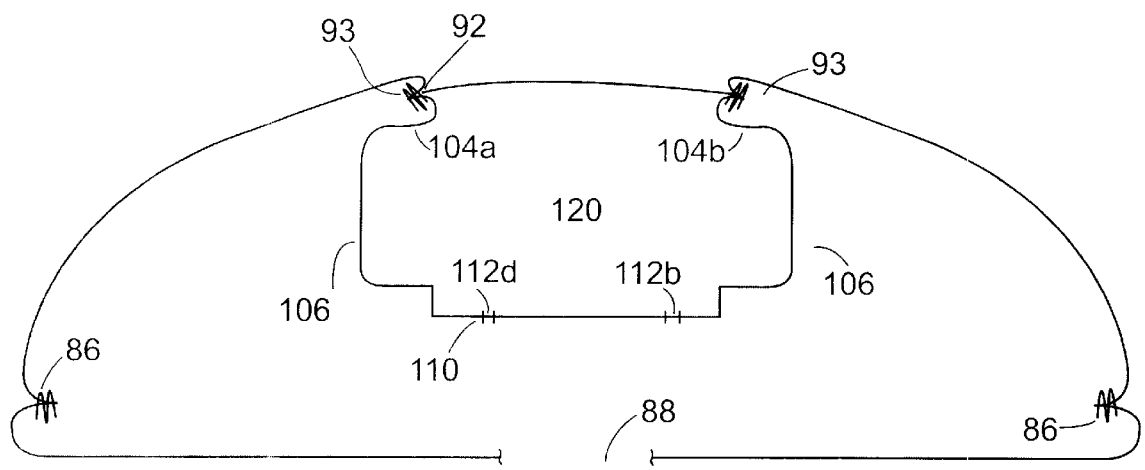
FIG. 7 is another cross-sectional view of the air bag with the center cylindrical tube pushed within the air bag.
Figure 8:
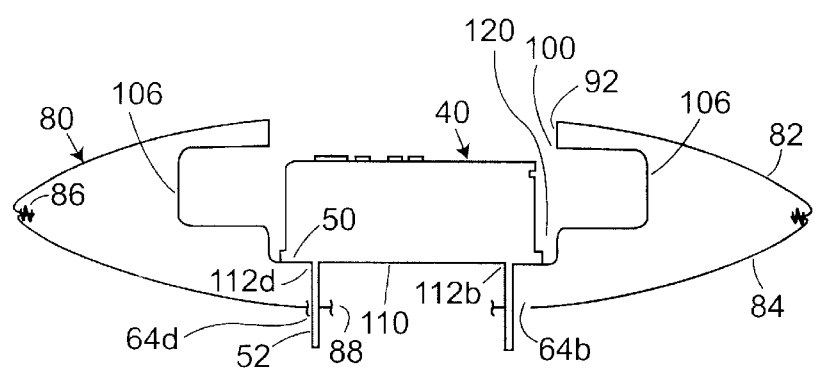
FIG. 8 adds the center control module to the configuration of FIG. 7.
Figure 10:
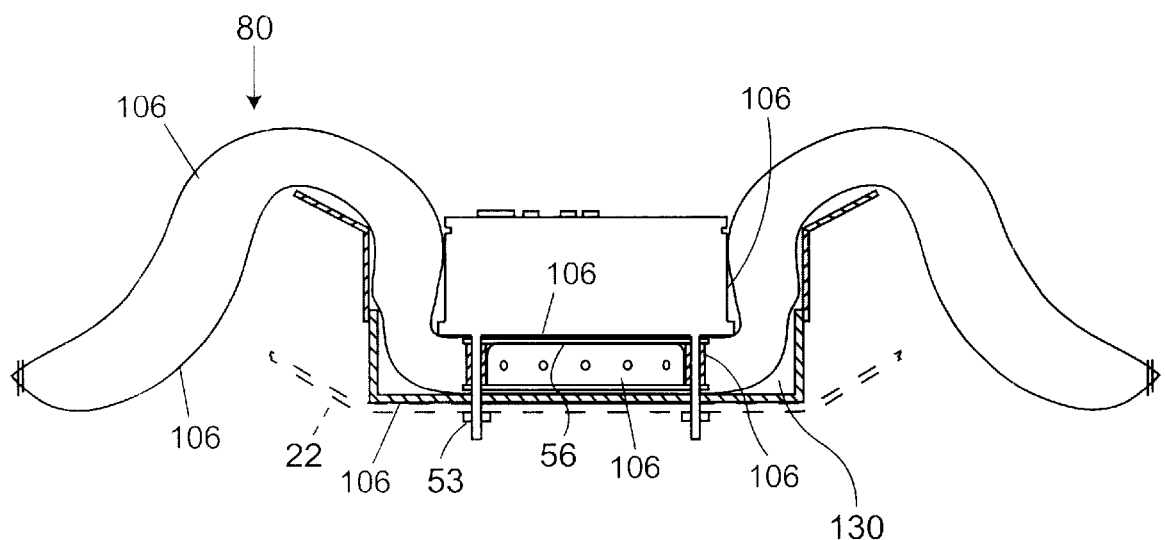
FIG. 10 is a cross-sectional view of an air bag module with an unfolded air bag extending radially outward.

Reference is made to FIG. 7, which is similar to FIG. 3. In FIG. 7 the tube 100 has been attached to the face panel 82, however, tube 100 has been moved, through the opening 92, from its position shown in FIG. 3, to lie inside the air bag 80 between panels 82 and 84. Additionally the lobes 106 have been pushed generally radially outwardly through openings 104a and 104b and also reside between the panels 82 and 84. In FIG. 7, the opening 92 of the face panel 82 is fully apparent with the tube 100 sewn thereto at seam 93. With the air bag as shown in FIG. 7, the center module 40 can be inserted through opening 92 and into the inverted tube 100. This configuration is shown in FIG. 8. The seam 86 and the seam 92a at the opening 92 can be internal or external (see FIG. 3 or FIGS. 7, 8). In FIG. 8, the studs 52 have been inserted through openings 112a–112d in the top panel 110 of the tube 100. The top panel 110 now resides adjacent the bottom 50 of the center module 40. The center module 40 is shown within the pocket 120 formed by the now-inverted cylindrical portion or tube 100. Thereafter, the ring 56 is inserted through the neck opening 88 and is placed on the studs and moved upwardly to sandwich the top 110 against the bottom of the center module 40. The tubes, spools or stand-offs 76 are then inserted onto each of the studs 56, which extend through the top panel 110. The tubes 76 also function to seal the openings in the ring 56 and to prevent leakage of inflation gas out from the cylindrical portion of the air bag. Subsequently, the inflator 60 is inserted through the neck opening 88 and positioned on the studs 54. Thereafter, the openings 64a–64d about the neck 67 of the rear panel 84 are inserted over the studs 52. As can be seen, the neck of the rear panel lies adjacent the bottom of the inflator. Finally the housing 30 is positioned on the studs sandwiching the neck portion of the rear panel against the flange of the inflator. The various parts of the module 20 can be secured in place by respective threaded nuts 53 to achieve the configuration as shown in FIG. 10. The same or different nuts or fasteners can be used to secure the housing, inflator and control module to the steering wheel 22 as shown in FIG. 2.

Prior to folding the air bag 50, the air bag 80 is extended outwardly over the sides of the housing 30 as shown in FIG. 10. Subsequently, the air bag 80 is folded to reside within the annular space 130 between the interior surfaces of the housing, the inflator and center control module 40.

The air bag can be folded in a number of different ways. For example, the air bag can be extended radially from the housing forming a circle and laid out flat. Thereafter, the air bag is folded in three accordion pleats, which generally resemble the sides of a triangle, reducing the partially folded shape to that of an equilateral triangle. Thereafter, additional accordion pleats are made in the points of the equilateral triangle and the folded parts are manipulated to fit within the space 130. Alternatively, the air bag can simply be pushed into the annular space 130.

Figure 12:
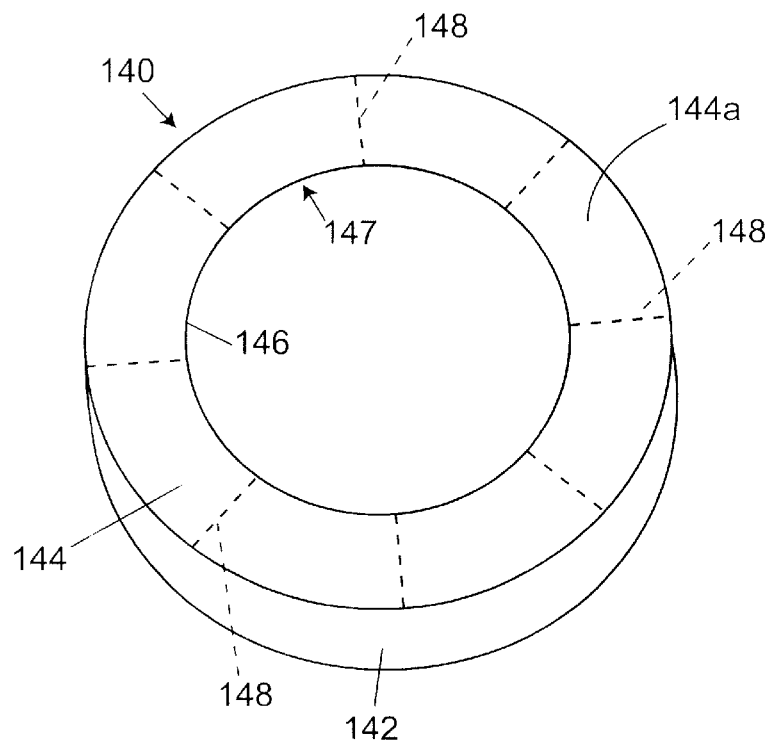
FIG. 12 is a top view of an exemplary cover.

Reference is again made to FIG. 1 as well as to FIG. 2, which show further details of the present invention. As can be seen, the center module 40 includes a peripheral groove 55, which is used to secure a center opening 146 of a cover. After the air bag is folded, it is covered by a cover 140. (A top view of the cover is shown in FIG. 12.) In one embodiment, the cover 140 is annular shaped and comprises a cylindrical outer wall 142 with a flat annular top 144 having a center hole 146. The diameter of hole 146 is smaller than the diameter of groove 55 so that the lip 147 about the opening 146 can slip within the groove and be secured thereby. In the preferred embodiment of the invention, the center module 40 is circular, however, shapes such as square or rectangular are within the scope of the present invention. The cover 140 additionally includes a plurality of generally radial tear seams 148. As the air bag fills with inflation gas, the lip 147 is pulled out of the groove 55 and the cover tears along each tear seam 148, which permits each sector or segment 144a of the cover to move or pedal outwardly permitting the air bag to exit about the open annular spacing between the now opened cover and the center module.

Figure 13:
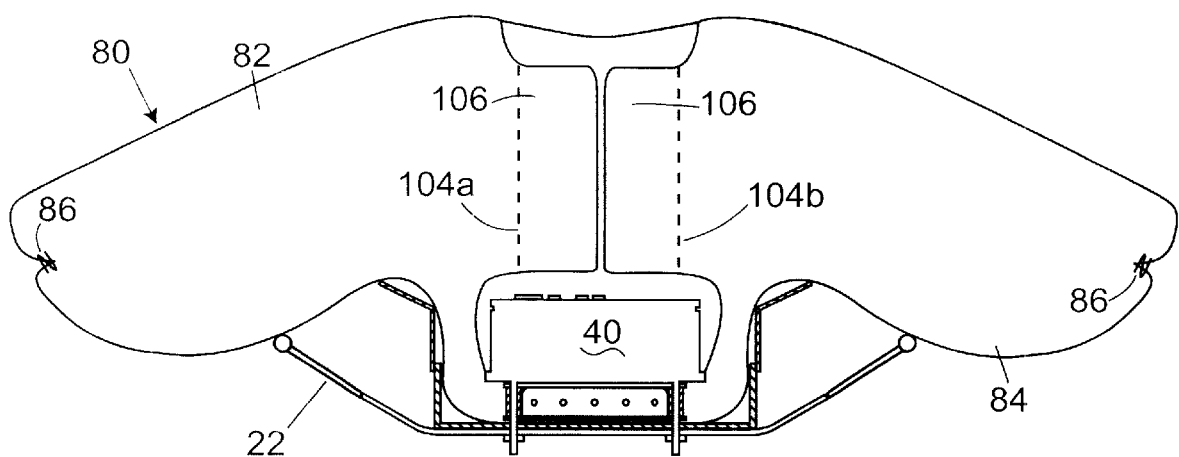
FIG. 13 is a cross-sectional view showing the air bag inflated.

Reference is briefly made to FIG. 13, which shows the air bag 80 in its inflated condition. As can be seen, the face and rear bag panels form an annulus centered about the center module. As the air bag inflates, the center lobes 106 are pushed (by inflation gas) radially inwardly, through the openings 104a,b, in front of and on top of the center control module. These lobes 106 provide a cushioned barrier between the center module and the occupant.

Figure 14:
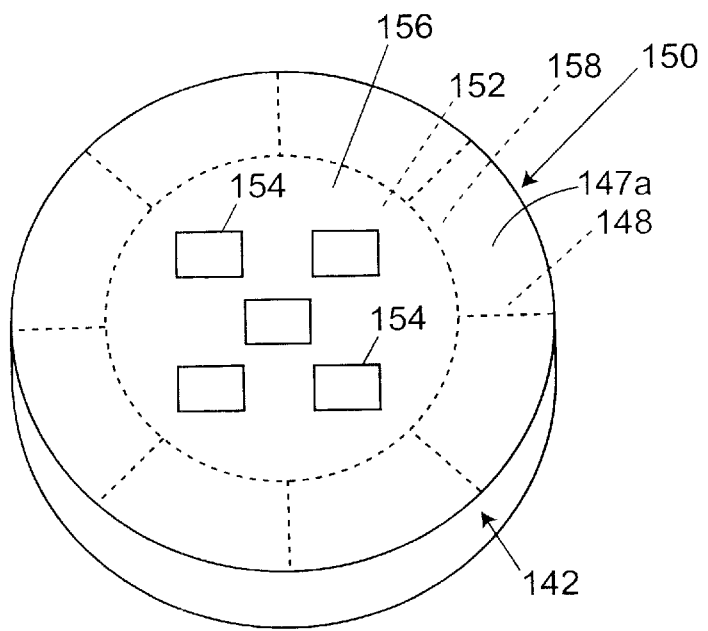
FIG. 14 shows an alternate air bag module with another cover.
Figure 15:
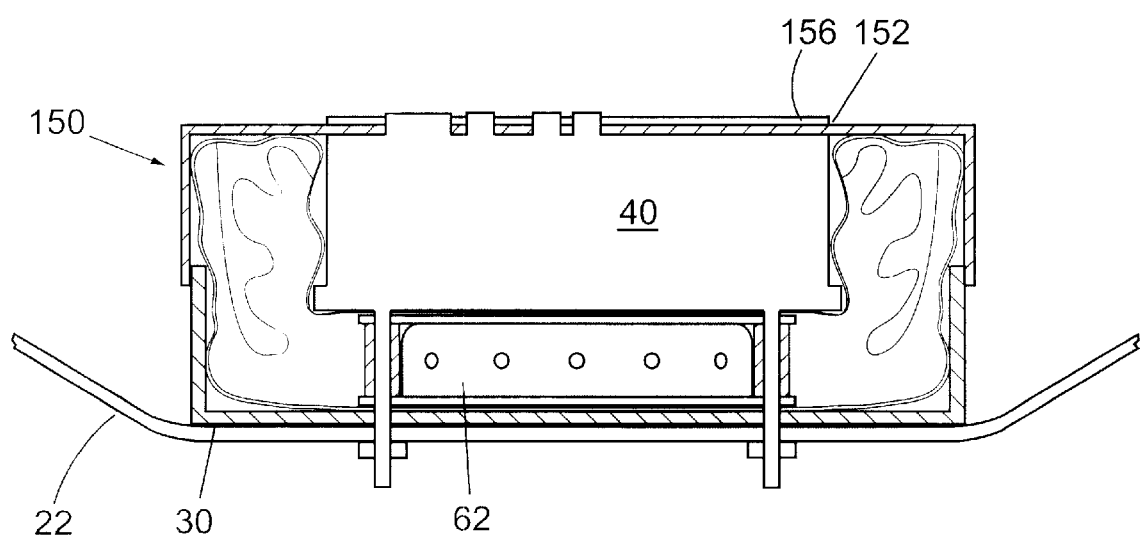
FIG. 15 is a top view of the module of FIG. 13.

Reference is made to FIGS. 14 and 15, which show a variant of the cover designated by numeral 150. The cover includes sides 142 and tear seams 148. However, in place of the opening 146, this cover includes a center portion 152 and a plurality of openings 154 through which the various control and informational mechanisms 42, 44, 46, etc. of the center control module 40 extend. A thin tear seam 158 joins the center portion 152 to the outer portions of the top 148. A fascia panel 156 (shown in FIG. 14) is positioned atop the center portion 152. The tear seam 150 can be positioned under the fascia panel or about it. This center portion 156 prevents the center portion from moving once the air bag tears through the tear seams 154 and 148. The fascia panel 156 is appropriately fastened to the center module 40.

Many changes and modifications in the above-described embodiment of the invention can, of course, be carried out without departing from the scope thereof. Accordingly, that scope is intended to be limited only by the scope of the appended claims.

What is claimed is:

1. An air bag module comprising an air bag, the air bag including:
    a face panel having a central, first opening;
    a rear panel having a second opening;
    an inflatable, cylindrical tube or tether member secured to the face panel, about the first opening, wherein the cylindrical tube is closed at one end by an end panel, the cylindrical member at an opposite second end secured to the face panel about the first opening, wherein the first opening is not obscured;
    at least one inflatable lobe secured about an opening in a wall of the cylindrical member, the lobe on inflation of the air bag inflates inwardly toward the center of the face panel.

2. The air bag module as defined in claim 1 including a cover to protect the air bag, wherein the cover is annular in shape and includes a plurality of tear seams on a top of the cover, the tear seams radially located about the control module and extending toward an outer diameter of the cover.

3. The air bag module as defined in claim 1 further includes a control module having at least one of an informational device and an activation button, the control module positioned centrally in the air bag module; and a cover to protect the air bag,
    wherein the cover is circular in shape and includes a plurality of tear seams on a top of the cover, the tear seams radially located about the control module and extending toward an outer diameter of the cover, the cover additionally includes an additional circumferential tear seam located generally along a periphery of the control module.

4. The air bag module as defined in claim 3 wherein the cover includes a plurality of tear seams on a top of the cover, the tear seams radially located about the control module and extending toward an outer diameter of the cover, the cover additionally includes an additional circumferential tear seam located generally along a periphery of the control module;
    further including a fascia plate located on the top of the cover, within an area defined by the circumferential tear seam.

5. The air bag module as defined in claim 1 wherein the face panel is circular.

6. The air bag module as defined in claim 1 wherein the first opening is circular.

7. An air bag module comprising:
    a control module having at least one of an informational device and an activation button, the control module positioned centrally in the air bag module;
    an air bag that is initially folded peripherally relative to the control module and when inflated expands to an annular configuration about the control module, the center of the annular configuration generally coaxial with an axis extending out of a top of the control module, the air bag including at least one inflatable part which expands into the center of the annular configuration providing an inflatable barrier relative to the top of the control module;
    a cover located above the peripherally folded air bag including a plurality of tear seams opened by the inflating air bag; and
    wherein the air bag includes at least one inflatable lobe which when inflated is repositioned from within the air bag to a position in which the inflatable lobe is covering the control module.

8. An air bag module comprising an air bag, the air bag including:
    a face panel having a first central opening therein;
    a rear panel having a second central opening therein, a portion of the rear panel about the second central opening forming a neck portion;
    a tubular insert having an open end secured to the face panel about the first central opening, the tubular insert including a closed end opposite the open end, the tubular insert extending into the air bag, and wherein sides of the tubular insert include at least one opening;
    the tubular insert including an inflatable portion having an open end secured about the at least one opening and upon inflation the inflatable portion is moved into the center of the tubular insert.

9. The module as defined in claim 8 including a center module located within the tubular insert and positioned adjacent the closed end.

10. The module as defined in claim 9 including an inflator for providing inflation gas to inflate the air bag, the inflator positioned below the center module within the air bag proximate the neck portion.

11. The module as defined in claim 10 including a housing below the inflator, the housing including a side wall spaced relative to sides of the center module defining an annular space therebetween and wherein the air bag is placed into this annular space and inflates from this annular space.

12. The module as defined in claim 11 including a cover having a plurality of tear seams on a top of the cover, the tear seams radially located and extending to the outer diameter of the cover.

13. The air bag module as defined in claim 12 wherein the cover includes an additional circumferential tear seam located generally proximate the periphery of the center module.

14. The air bag module as defined in claim 13 further including a fascia plate located on the top of the cover, within an area defined by the circumferential tear seam.

15. The air bag module as defined in claim 14 wherein the circumferential tear seam is circular.

* * * * *